Nov. 16, 1937.  C. L. SELLEN  2,098,977
HOSE SUPPORTER
Filed Feb. 1, 1935  3 Sheets-Sheet 1
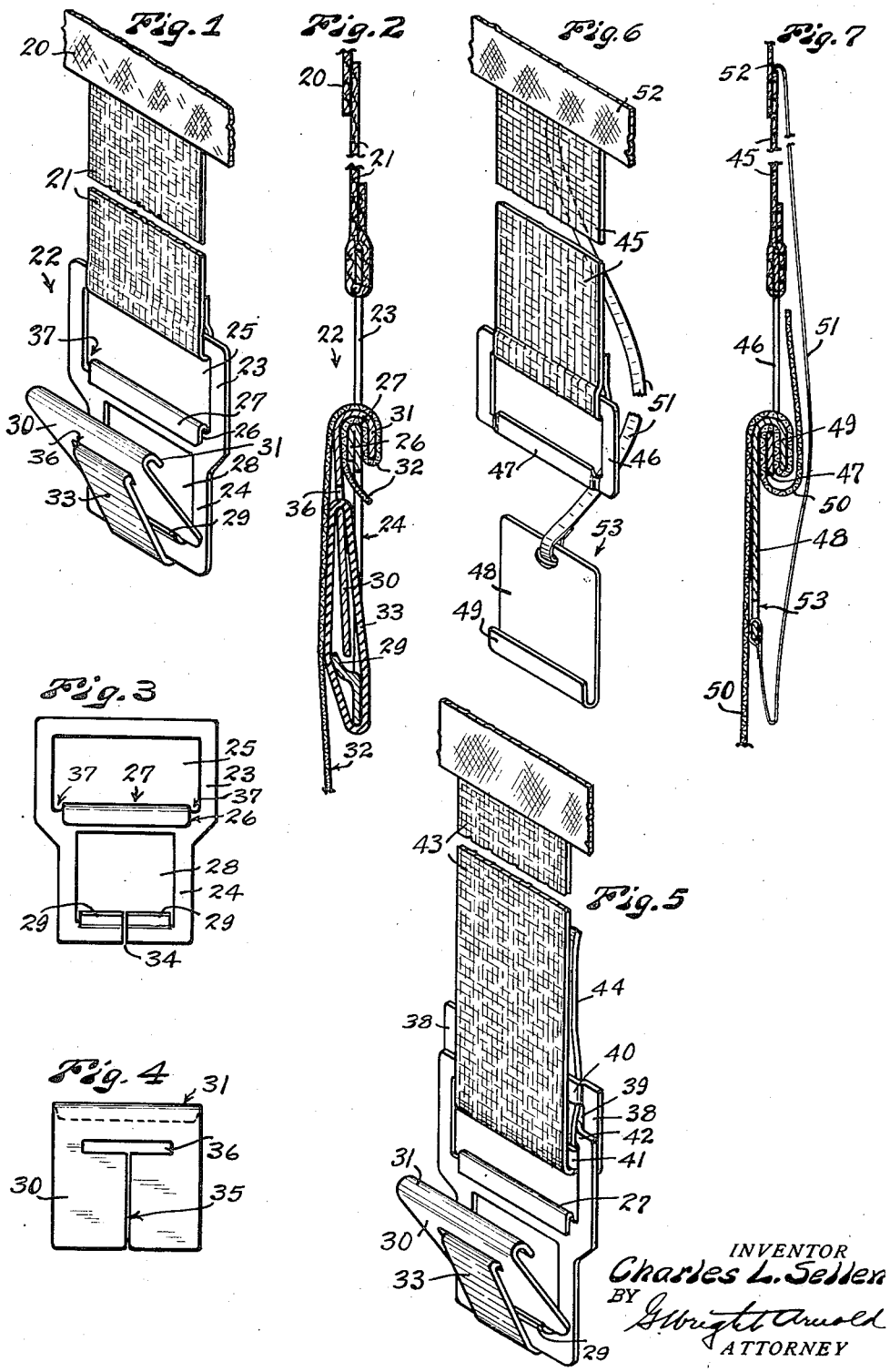
INVENTOR
Charles L. Sellen
BY
J. Wright Arnold
ATTORNEY

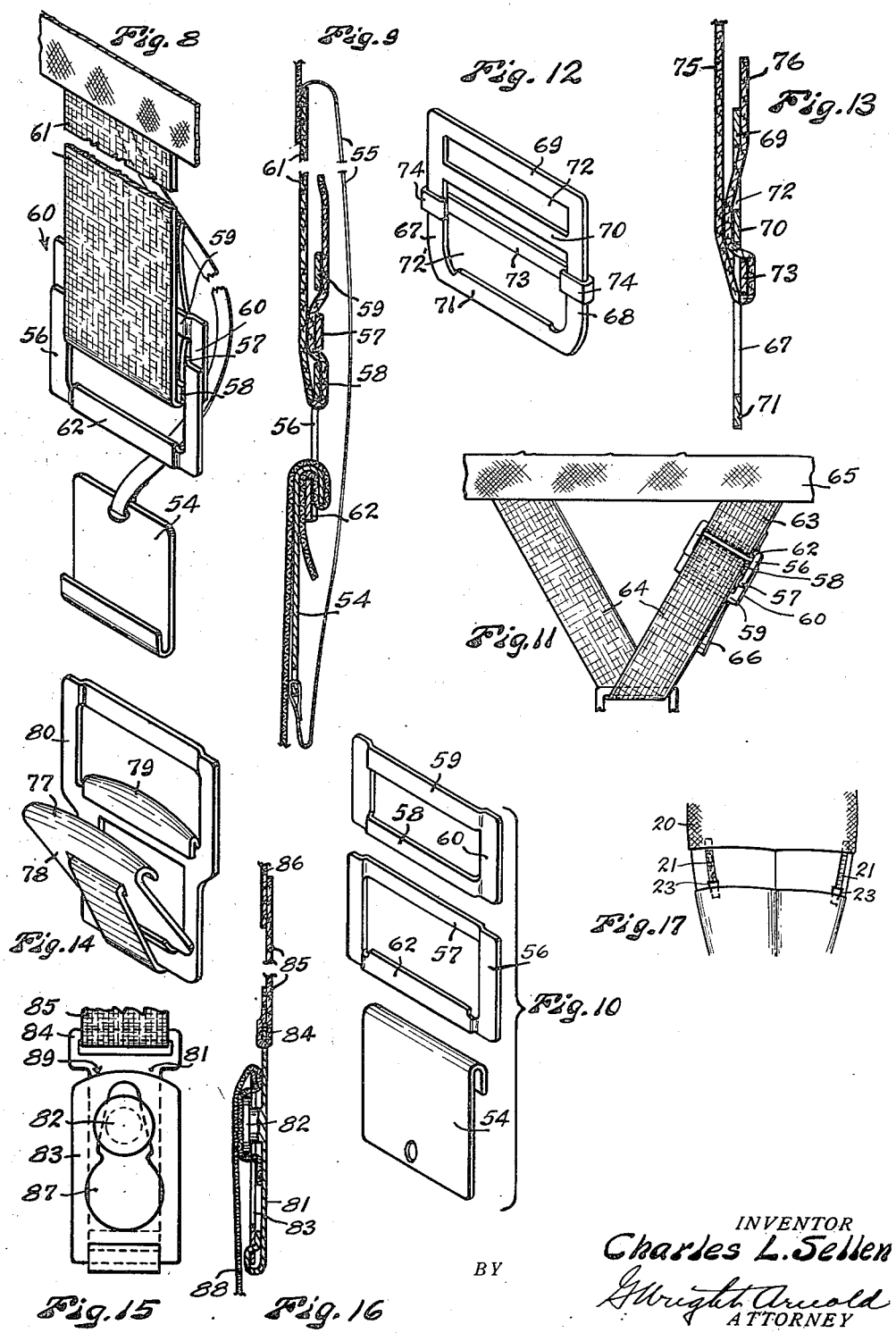

Nov. 16, 1937.                C. L. SELLEN                 2,098,977
                             HOSE SUPPORTER
                         Filed Feb. 1, 1935         3 Sheets—Sheet 3

INVENTOR
Charles L. Sellen
BY G. Wright Arnold
ATTORNEY

Patented Nov. 16, 1937

2,098,977

UNITED STATES PATENT OFFICE 2,098,977

HOSE SUPPORTER

Charles L. Sellen, Seattle, Wash., assignor to Stuart D. Barker, Seattle, Wash.

Application February 1, 1935, Serial No. 4,554

8 Claims. (Cl. 24—243)

My invention relates to hose supporters. More particularly, my invention relates to a hose gripping device which will insure positive and efficient securing means between the elastic supporter and the hose.

Heretofore, many types of hose supporters have been in common use for women. At one time the hose supporting device for women generally consisted of a rubber band of varying size and width encircling the leg and the upper part of the hose. This type of hose supporter is not now the commonly used device. At the present time, foundation garments and girdles of various sorts are in general use, with elastic supporters between the girdle and the hose. Also garter belts, functioning in a similar manner and having elastic supporters between the garter belt and the hose, are employed. In providing an attachment between the elastic supporter and the hose, many types of clasps, generally known to the trade as "grips" or "fasteners" have been previously employed. These various clasps have many disadvantages, among which are included the disadvantage of pulling, tearing, starting runs in the hose, and taking up the hose in circumferential directions, thus tending to tighten the hose on the leg. Also, the usual rubber button forms a projection, and in consequence, with the thin fabric and form fitting dresses of today, this projection of the hose clasp becomes noticeable and highly objectionable. This projection also increases the wear on portions of garments which overlie it. Furthermore, the clasping means heretofore used are long, and only a relatively small amount of elastic supporter between a supporting garment, such as a foundation garment or garter belt, and the hose is, therefore, available.

It is the object of my invention to overcome the above problems in the art, and to provide a positive and efficient clasp means which is substantially flat on the side adjacent the hose, which will lie flat against the wearer's leg, minimize wear on overlaying garments, eliminate undesirable projections and permit the hose supporter to be worn with the thin garments of today without leaving any tell-tale mark that a hose clasp is present therebeneath. Also it is an object to provide a hose clasp which will grip the top portion of the hose firmly and securely without taking up said hose circumferentially, thus avoiding all tendency to tighten the hose around the leg.

It is a further object of my invention to provide a device which will provide a minimum space between the elastic supporter and the part of the hose clasped, thereby permitting unusually long elastic supporters and greater comfort and freedom to the wearer.

It is a further object of my invention to provide a device which will grip uniformly over a broad area and thereby minimize the danger of runs or tears in the relatively delicate hose of today. This is to be directly contrasted with the generally used button type of supporter, where a portion of the hose is placed over a rubber button and a sliding clamp secures a very limited number of threads in direct contact with the button. It is generally recognized in the trade that this rubber button type of hose supporter creates runs, and the trade generally provides various means in the hose to prevent the runs caused in the upper part of the hose from being communicated to the lower portion of said hose. These objectionable features are minimized by my device, for the reason that the broad contact or bearing surface affords a substantially uniform strain over a relatively large area of the hose and minimizes trouble from runs.

It is a further object of my invention to provide a hose clasp which may be very quickly and easily attached to or detached from the hose, either at a point close to the top of the hose or at any desired distance down from the top of said hose.

It is a further object of my invention to provide an adjustable elastic holding means which may be used in connection with a hose clasp and elastic support therefor so that the length of the elastic support and the distance between the hose clasp and the foundation garment or garter belt may be readily and easily adjusted. Also it is an object to provide an elastic holding means which is free of teeth or similar projections and which is quickly and easily adjustable without requiring the use of the finger nails.

It is a further object of my invention to provide an adjustable elastic holding means which is efficient in operation and not subject to undesirable slipping and is further characterized by the absence of raised or projecting portions which may be noticeable.

The above mentioned general objects of my invention, together with others inherent in the same, are attained by the devices illustrated in the following drawings, the same being preferred exemplary forms of embodiment of my invention, throughout which drawings like reference numerals indicate like parts:

Figure 1 is a perspective view on an enlarged scale of a hose supporter constructed in accordance with my invention showing the hose clasping means in open position;

Fig. 2 is a vertical sectional view of the same on a larger scale than Figure 1, showing the clasp means closed and the top portion of a hose secured in the clasp means;

Figs. 3 and 4 are detached views in elevation, on substantially the same scale as Figure 1, of the two members of the hose clasp;

Fig. 5 is a perspective view, on an enlarged scale, illustrating an embodiment of the hose clasp shown in Figs. 1 to 4, provided with an improved adjustable elastic holding means;

Fig. 6 is a perspective view, on an enlarged scale, of a modified form of a hose clasp embodying my invention;

Fig. 7 is a vertical sectional view, on a larger scale than Fig. 6, of the hose clasp shown in Fig. 6, showing the top portion of a hose engaged within the hose clasp means;

Fig. 8 is a perspective view, on an enlarged scale, of an adjustable elastic holding means which may be used in connection with my hose supporters;

Fig. 9 is a vertical sectional view, on a larger scale than Fig. 8, illustrating the adjustable elastic holding means shown in Fig. 8 used in connection with the hose clasp shown in Figs. 6 and 7;

Fig. 10 is an exploded perspective view, on substantially the same scale as Fig. 8, of the adjustable elastic holding means and the hose clasp means shown in Figs. 8 and 9, with the elastic and the hose omitted;

Fig. 11 is a perspective view of a V or "trolley" type elastic hose supporting means embodying the adjustable elastic holding means illustrated in Figs. 8, 9 and 10;

Fig. 12 is a perspective view on an enlarged scale of a modified form of my adjustable elastic holding means;

Fig. 13 is a vertical sectional view, on a larger scale than Fig. 12, of the apparatus shown in Fig. 12 and illustrating an elastic operatively positioned therein;

Fig. 14 is a perspective view on an enlarged scale, of a modified form of my invention illustrating rounded bearing surfaces on the hose clasp for engagement with the hose;

Fig. 15 is a front elevation on an enlarged scale of a modified form of my invention;

Fig. 16 is a vertical sectional view, on a larger scale than Fig. 15, of the device shown in Fig. 15, illustrating the upper portion of a hose clasped therein;

Fig. 17 is a somewhat pictorial view showing the clasp in use, illustrating a foundation garment, elastic supporters, and a pair of hose with parts broken away;

Figure 18:
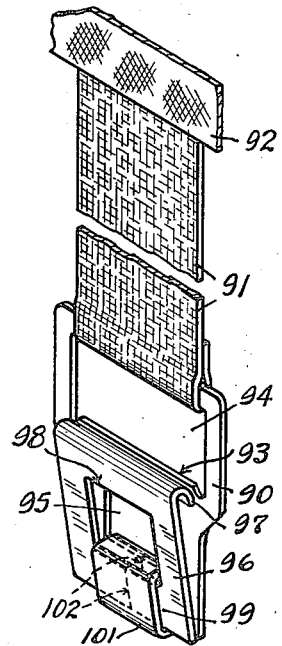
Fig. 18 is a perspective view on an enlarged scale of another modified form of my invention showing the hose engaging member in disengaged position.

Referring to Figs. 1 to 4, inclusive, a foundation garment or garter belt is indicated by 20. Attached to the foundation garment 20 is a pliable strap supporter 21 which may be in the nature of an elastic, and which is so hereinafter termed. The hose clasp, indicated generally by 22, may be attached to the elastic supporter 21 by the usual sewn loop as indicated in Figure 1.

The hose clasp 22 comprises a frame member in the form of a piece of relatively flat thin non-pliable material, such as sheet metal. This frame member embodies an upper loop portion 23 and a lower hose clasp portion 24. The lower end portion of the elastic 21 is secured to the loop 23 and supports the hose clasp member. The central part of the upper loop portion 23 is cut away to form a relatively large opening 25 and the metal at the lower portion of the opening 25 is preferably bent outwardly and downwardly, as at 26 against the frame of the hose clasp member 22 to form a relatively long transverse bar 27 having a rounded edge, which transverse bar cooperates with parts hereinafter described in clasping and holding a hose. The transverse bar 27 is supported by the loop 23 which is in turn supported by the elastic 21.

The central part of the lower hose clasp portion 24 is also cut away to leave a relatively large clearance opening 28 therein. Relatively short portions 29 of metal are bent outwardly at an angle at the lower edge of the opening 28 to form retaining and positioning means for a movable hose engaging member 30. The hose engaging member 30 is preferably formed of a flat piece of relatively thin non-pliable material which is flat, except at its upper edge portion, where it is bent over to form a hook like hose receiving member 31 for engagement with the upper end portion of a hose 32, see Fig. 2. The lower edge portion of the movable hose engaging member 30 is urged against the retaining members 29 by an elastic loop 33 when the movable hose engaging member is in the open position shown in Fig. 1. When the movable hose engaging member 30 is in securing position, as shown in Fig. 2, the hook like member 31 is secured against a hose 32 which in turn is positioned against the transverse bar 27 and the lower edge portion of the movable hose engaging member 30 does not engage with the retainer members 29. The opening 28 in the lower hose clasp portion 24 serves to receive and provides clearance for the elastic loop 33.

For the purpose of facilitating the installation of the elastic loop 33, so that an endless loop may be used, I preferably provide a slot 34 extending from the lower edge of the hose clasp portion 24 upwardly through the lower part of said hose clasp portion and through the retaining members 29, see particularly Fig. 3. I further provide a slot 35 in the movable hose engaging member 30 (see particularly Fig. 4), which extends upwardly from the lower portion thereof and intersects a transverse slot 36. The transverse slot 36 is preferably provided just below the hook like member 31 so as to accommodate a relatively long elastic loop 33 and to provide for a sufficient turning moment urging the movable hose engaging member 30 to an open position.

It can be readily seen that the elastic loop 33 may be turned sidewise and inserted through slot 35 into slot 36, so that it will be retained in the transverse slot 36 and likewise it may be inserted through the slot 34 and then turned sidewise and engaged with the lower hose clasp portion 24.

Referring to the operation of the device illustrated in Figs. 1 to 4, inclusive, the elastic supporter 21 hangs downwardly from an upper support, such as a foundation garment 20, and the hose clasp 22 and the elastic supporter 21 lie flat against the leg. When the hose clasp 22 is in the open position as indicated in Figure 1, the upper portion of the hose 32 is placed over the movable hose engaging member 30. Then the movable hose engaging member 30 is angularly moved and elevated until the hook like member 31 is positioned over the transverse bar 27 with the hose 32 disposed between the transverse bar 27 and the hook like member 31. The relation of the parts in this position is shown in the sectional view, Fig. 2. As indicated in this sectional view, the hose 32 first passes over the relatively wide hook like member 31, then downwardly around the hook like member, then forms a loop which extends upwardly and downwardly within the hook like member and extends over the transverse bar 27. This multiple reversal of direction of the hose around the hook like member and over the transverse bar 27 is extremely important in preventing slippage and forms an efficient non-slipping and readily engageable and disengageable clasping means.

When the hose 32 is engaged within the hose clasp 22, as shown in Fig. 2, it is apparent that downward pull of the hose will tighten the gripping action of the hose clasp as the hose 32 passes over the hook like member 31. When no downward pull is exerted by the hose 32, the elastic loop 33 provides sufficient tension urging the hook like member 31 toward the transverse bar 27 to prevent accidental disengagement or release of the hose clasp.

To disengage the clasp it is only necessary to raise the hook like member 31 free of engagement with the transverse bar 27. This may be readily done by engaging the same with a finger. As soon as the hook like portion 31 is disengaged from the transverse bar 27 the elastic loop 33, which is under tension, together with the pull of the hose 32, will quickly and readily cause the movable hose engaging member 30 to swing outwardly and assume the position in which it is shown in Fig. 1. After the movable hose engaging member 30 has assumed the position shown in Fig. 1 the hose 32 will readily disengage itself.

As best shown in Fig. 3, the edges of the upper loop portion 23 adjacent the transverse bar 27 are preferably cut away to form recesses 37. These recesses 37 eliminate sharp corners, provide relief notches in the transverse bar 27 directly under the edges of the hook like member 31 and obviate any danger of cutting the threads of the hose 32 in case of relative weaving action between the hook like member 31 and the transverse bar 27.

All of the parts lie substantially flat against the leg. This is particularly important to prevent projecting portions which may be noticeable where close fitting garments are worn over the hose supporters, to prevent any tell-tale relief in the garments, indicating the presence of hose supporters therebelow and to prevent wear on overlaying garments.

Furthermore, the relatively wide hook like member 31 provides a relatively broad bearing member over which the hose is drawn. The hook like member 31 may be of any suitable width, such as 5/8 of an inch—the exact minimum width depending upon the threads necessary to prevent strain on the hose and will not ordinarily be less than 3/8 of an inch—the exact maximum width depending upon the appearance and will not ordinarily be over one inch. This provides a relatively broad bearing member as compared to the button type clasp, where the surface of the hose in engagement with the clasp is only substantially 1/4 of an inch.

The device indicated in Fig. 5 differs from the device indicated in Figs. 1 to 4, inclusive, in that an adjustable strap holding means cooperates with the clasp to form a connection between the strap supporter, which may be an elastic, and the hose clasp. This adjustable elastic holding means is in the nature of an additional loop like member 38, preferably formed of thin sheet metal. The loop member 38 is of generally rectangular shape and has its central portion cut away to leave a relatively large opening 39. This loop 38 has an elastic keeper 40 above the opening 39 and an elastic holding bar 41 below said opening 39. Both of the bars 40 and 41 are preferably off-set transversely in the same direction. An elastic engaging bar 42 of the hose clasp member, with which this adjustable elastic holding means is used, may also be offset transversely.

When the device is assembled the elastic engaging bar 42 of the hose clasp member is positioned between the bars 40 and 41 and the respective off-sets of the several bars are preferably such as to bring all of said bars substantially into the same plane. When this adjustable elastic holding device is in assembled position, a hose supporting elastic 43, corresponding in purpose and function to the hose supporting elastic 21 previously described, will extend downwardly from the foundation garment over the outer sides of the bars 40, 42 and 41, thence inwardly under the elastic holding bar 41, thence outwardly between the elastic holding bar 41 and the lower edge portion of elastic engaging bar 42, thence inwardly between the top edge of elastic engaging bar 42 and the lower edge of elastic keeper bar 40, and terminates in a free end 44 preferably positioned on the inner side of the elastic supporting member 43 and adjacent the leg of the wearer. When a downward pull is exerted on the hose clasp member, tending to place the hose supporting elastic 43 under tension, a force will be exerted tending to move the bars 41 and 42 toward each other. This will tend to clamp the hose supporting elastic 43 between said bars 42 and 41. This clamping action, together with the snubbing action, due to the fact that the elastic supporting member 43 passes around the bottom edge of the bar 41 and its direction is substantially reversed at this point, will grip the elastic supporting member very firmly so that side sway and weaving motion will not tend to loosen the elastic supporting member in the elastic holding means. At the same time the free end 44 of the elastic holding member 43 passes between the upper edge of elastic engaging bar 42 and the lower edge of elastic keeper bar 40, thus holding this free end and preventing any releasing action of the same when the pull on the elastic is alternately applied and released and when the hose clasp is subjected to weaving action, tending to vary the line of pull on the elastic. By exerting a pull on the free end 44 the elastic may be drawn through the holding means and in this way adjusted to any desirable length. This provides a quick and easy adjustment by which the effective length of the elastic may be adjusted any desired amount. This quick and easy adjustment provides a convenient way for taking up the elastic when the same tends to permanently elongate in service. The remaining parts of the device illustrated in Fig. 5 are similar to and operate in a similar manner to the similar parts indicated in Figs. 1 to 4, inclusive, and for that reason they are not here described and are numbered similar to the parts indicated in Figs. 1 to 4, inclusive.

In Figs. 6 and 7, I have indicated a modification of my invention where the hose clasp is formed of two members. In these figures the elastic supporter 45 functions similar to the elastic supporter 21 indicated in Figs. 1 to 4, inclusive. This elastic supporter is secured by any suitable means to a loop like member 46. The loop like member 46 is provided with a transverse bar 47, which functions similarly to the transverse bar 27 in Figs. 1 to 4, inclusive. The movable hose engaging member 48 functions similarly to the movable hose engaging member 30 illustrated in Figs. 1 to 4, inclusive. As indicated in Fig. 7 the hook like member 49 of the movable hose engaging member 48 disposes a hose 50 in engaging position around the transverse bar 47 and within the hook like member 49. The operation of the device indicated in Figs. 6 and 7 is similar to the operation of the device shown in Figs. 1 to 4, except that the elastic loop 33 is eliminated and the parts are not directly secured together thereby. As indicated in Fig. 7, the hose clasp may be readily attached to a portion of the hose below the top without folding the hose back in the usual manner and the free end of the hose may be directed upwardly as indicated.

When the parts are separable, as indicated in Figs. 6 and 7, a pliable or flexible releasing member 51 preferably connects such parts together as by connecting the movable hose engaging member 48 with a foundation garment 52. The pliable releasing member 51 serves two functions in my device. First, it serves as a means to conveniently position a movable hose engaging member 48 when the same is not in engaging position, and second, the pliable releasing member 51 serves as a means for readily releasing or disengaging the hose clasp.

Referring to Fig. 7, it will be seen that an upward pull on the pliable releasing member 51 will urge the end portion 53 of the movable hose engaging member 48 inwardly toward the leg of the wearer and upwardly and readily disengage the hook like member 49 from the transverse bar 47, thus releasing the hose 50.

To facilitate adjustment of the elastic supporter 45 indicated in Figs. 6 and 7, I provide the adjustable elastic holding means in connection therewith, as indicated in Figs. 8, 9 and 10. In Figs. 8, 9 and 10, the movable hose engaging member 54 may be similar to the hose engaging member 48 shown in Figs. 6 and 7 and may have a similar flexible pliable releasing member 55. An open loop member 56 of substantially rectangular shape, similar to the hereinbefore described loop member 46, is provided. This loop member 56 has an elastic engaging bar 57 which may be transversely off-set and which cooperates with an elastic holding bar 58 and an elastic keeper bar 59 of another loop member 60 for the purpose of receiving and adjustably holding an elastic supporting member 61. The elastic supporting member 61 is interconnected with the bars 58, 57 and 59 in the manner hereinbefore described in connection with bars 41, 42 and 40, and the operation of this interconnection in adjustably holding the elastic supporter will be readily understood in view of the showing in Figs. 8 and 9 and in view of the description and showing in connection with Fig. 5. The cooperation of the movable hose engaging member 54 and the transverse bar 62 of the loop 56 engaging and holding the hose is substantially the same as the cooperation of the like parts 47 and 48 shown and described in connection with Figs. 6 and 7 and it is believed to be clearly apparent without further description.

In Fig. 11, I have shown an adjustable elastic holding means similar to the form disclosed in Figs. 8, 9 and 10, applied to a pliable supporting means independently of the hose clasp. In this figure, 63 and 64 are two pliable supporting members which are to be adjustably connected together. As one convenient adaptation of this adjustable elastic holding means to hose supporters, I have shown the pliable supporting members 63 and 64 secured to and depending angularly from a foundation garment 65 to form a V shaped or "trolley type" supporting means. This arrangement may, however, be varied at will as the two parts of pliable supporting members 63 and 64, which are adjustably connected, are in alignment with each other and may extend in any desired direction. In this adaptation the adjustable elastic holding means is reversed in position as contrasted with the showing in Figs. 8 and 9 and the pliable supporting member 63 is fixedly connected with the transverse bar 62 of loop 56. The other pliable supporting member 64 is threaded through and interconnected with the loop members 56 and 60 in the same manner as the elastic member 61, shown in Figs. 8 and 9, i. e., the pliable supporting member 64 passes from the outside through loop member 56 and around elastic holding bar 58 of loop member 60, thence between elastic holding bar 58 of loop member 60 and elastic engaging bar 57 of loop member 56, thence between elastic engaging bar 57 of loop member 56 and elastic keeper bar 59 of loop member 60. When the several parts are positioned as above described the free end 66, of the pliable supporting member 64, is underneath the tension or load supporting portion thereof and next to the body of the wearer. It is firmly held by the elastic keeper bar 59 so as to prevent slackness in those portions of the pliable supporting member 64 which frictionally engage with, and are securely held by, the bars 57 and 55. Said pliable supporting member 64 will be firmly and securely and immovably held irrespective of the amount of strain, or of slackness, or of alternate strain and slackness, or of so called side weave in the nature of angular variation in the direction in which the strain is exerted on the tension portion of the pliable supporting member 64. At the same time the free end 66 is readily accessible to the wearer at all times for purpose of adjustment. A pull exerted on this free end 66 will take up any desired amount of slack, or by obvious manipulation of loop members 56 and 60 their clamping action on the pliable supporting member may be released and the free end portion 66 drawn back through said loop members to provide for extension or elongation. The pliable supporting members 63 and 64 may be of elastic or non-elastic material. However, when they are used for hose supporters they will ordinarily be of elastic material. The pliable supporting member 64 may be passed through and connected with the loop portion of any of the hose clasp means hereinbefore described. I have shown a portion of the loop member 23 of Figs. 1 to 4 supported thereby.

In Figs. 12 and 13, I have shown a modified form of an adjustable elastic holding member which may be employed instead of the adjustable elastic holding members shown in Figs. 5, 8, 9, 10, or 11. This elastic holding member comprises a thin flat frame member formed of two spaced apart side bars 67 and 68 connected by three relatively rigid cross bars, i. e., an upper transverse keeper bar 69, a transverse strap engaging bar 70, and a lower transverse bar 71. The bars 69 and 70 are positioned near one end of the side bars 67 and 68 and are spaced a short distance apart to leave a narrow opening 72 therebetween. These bars 69 and 70 function similarly to the bars 40 and 42 of Fig. 5 and the bars 57 and 59 of Figs. 8, 9, 10 and 11, except that the bars 69 and 70 are not relatively movable. The lower transverse bar 71 is positioned near the other ends of the side bars 67 and 68 and has the same hose securing function as the transverse bars 27, 47 and 62. A larger opening 72' is formed between the bars 70 and 71. A movable elastic holding bar 73 extends crosswise of the opening 72 between the side bars 67 and 68. The movable elastic holding bar 73 is provided at its respective ends with slidable connecting means 74 connecting said bar with the side bars 67 and 68. This provides a mounting means which leaves the movable elastic holding bar 73 free to move toward and away from the elastic engaging bar 70. A pliable supporting strap, such as an elastic 75, is adapted to cooperate with the elastic engaging means as shown in Fig. 13. This elastic 75 extends through the opening 72, around the movable elastic engaging bar 73, between the bars 73 and 70, thence over the bar 70, thence between the bars 70 and 69 and terminates in a free end 76, positioned alongside of the tension or weight supporting portion of said elastic 75. When the pliable supporting member 75 is under tension the movable bar 73 will be drawn upwardly into close proximity to the relatively fixed bar 70 and the elastic 75 will be snubbed about the movable bar 73 and frictionally held between said movable bar 73 and the relatively fixed bar 70. Also the free end 76 of the pliable supporting member will pass between the bars 70 and 69 and will be held by said bars in such a manner as to prevent slackness in the portions of the elastic which frictionally engage with the relatively fixed bar 70 and the movable bar 73. This operates in a manner similar to the devices shown in Figs. 5, 8, 9 and 11, forming an elastic holding means which will not slip or work loose, and which is readily adjustable, either as respects take up or lengthening the same.

In Figs. 1 to 4, inclusive, the hook like member 31 of the movable hose engaging member 30 engages with the transverse bar 27. In the modified forms of the invention in each instance the hook like member is shown engaging with a functionally similar transverse bar. In the modified form of my invention shown in Fig. 14, a hook like hose engaging member 77 is provided on a movable hose engaging member 78. The hook like engaging member is adapted to receive and engage a hose in cooperation with the transverse bar 79 of the hose clasp member 80.

These parts cooperate in the manner described in connection with the preceeding hook like members and transverse bars, except that the hook like hose engaging member 77 is curved transversely as respects the movable hose engaging member 78. The transverse bar 79 is similarly curved to interfit with and cooperate with the hook like member 77. These curved portions provide an engagement where the pull on the threads of the hose will be substantially the same, whether the threads engage the hook like member in the middle or near the edges thereof. Obviously, the modification shown in Fig. 14 may be adapted and used upon any of the various modifications of my invention heretofore illustrated. In the present instance, however, I have indicated the same used in connection with the form of the device illustrated in Figs. 1 to 4, inclusive, and have only described the parts which are dissimilar to those previously described in connection with Figs. 1 to 4 inclusive.

Figure 19:
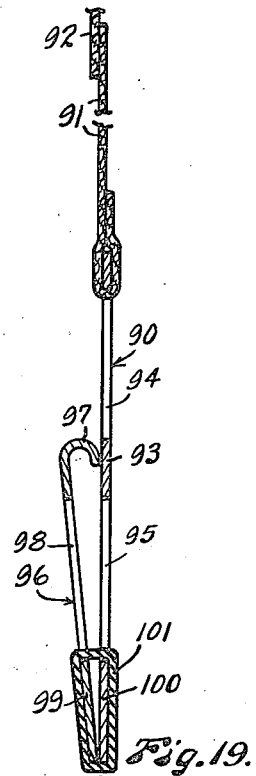
Fig. 19 is a vertical sectional view of the device shown in Fig. 18 on a larger scale than Fig. 18.
Figure 20:
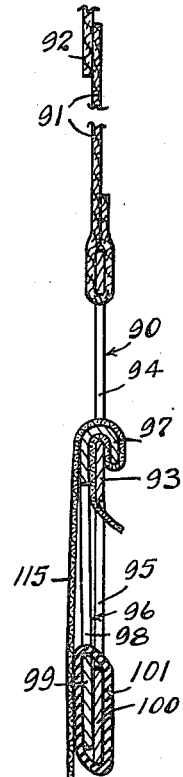
Fig. 20 is a vertical sectional view similar to Fig. 19, except that a hose is shown in engaged position within the hose clasp.

In Fig. 18 I have shown a modified form of hose clasp embodying a frame member 90 supported by a strap or elastic 91 from a foundation garment 92. The frame member 90 has a transverse bar member 93 and is cut away to leave openings 94 and 95 above and below said bar member respectively. A hose engaging member 96, having a hook like upper end portion 97, is positioned adjacent the lower portion of the frame member 90. The central portion of the hose engaging member 96 is cut away to leave an opening 98 and a plate like portion 99 is provided below said opening 98. A similar plate like portion 100 is provided at the lower end of the frame member 90 below the opening 95. An elastic band 101, under tension, extends around both plate like portions 99 and 100 and exerts a force tending to draw said two plate like portions together. The elastic band 101 may be an endless rubber band. The plate like portions 99 and 100 may be transversely cut or severed, as indicated by dotted lines 102 in Fig. 18, to permit the endless rubber band to be positioned over the two plate members. The cuts 102 do not need to be of substantial width, as the two parts of the plate members 99 and 100 on opposite sides of said cuts 102 are resilient and may be relatively displaced sidewise at the time the rubber band is being passed therethrough. When this hose clasp is released, the hose receiving member will normally be in the position shown in Fig. 19 with the hook like portion 97 held against the transverse bar 93 and slightly below the top edge of said transverse bar 93 by the rubber band 101. To engage a hose 115, Fig. 20, with said hose clasp, the top end portion of a hose 115 is drawn over the hook like portion 97 and the hose engaging member is drawn upwardly and the hook like portion 97 hooked over the transverse bar 93 with the hose passing over the hook like portion and within the hook like portion and over the bar 93. The hose is thus very securely clasped and held. The downward pull on the hose is exerted on the top of the hook like portion 97, which is rounded and is relatively broad from end to end and provides engagement for a sufficient number of threads of the hose so that there is substantially no danger of breaking any of the threads and starting runs in the hose. When the hose engaging member 96 is in the engaged position, the plate like portions 99 and 100 will be relatively displaced vertically as shown in Fig. 20, and the rubber band 101 will yieldingly urge the hook like member 96 downwardly toward the transverse bar 93 into hose engaging position. The bar supporting means for the transverse bar 93 is the upper portion of the frame member 90 and the elastic 91 connected with the foundation garment 92.

Figure 21:
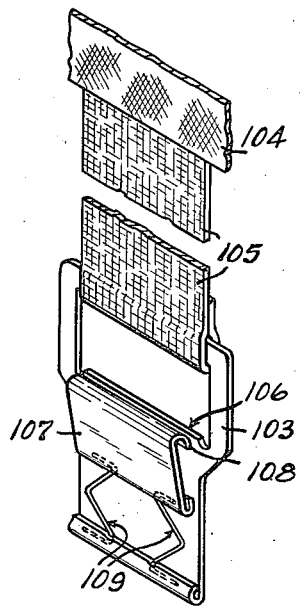
Fig. 21 is a perspective view on an enlarged scale of another modified form of my invention.

In Fig. 21 I have shown another modified form of my invention in which metallic spring means are provided for connecting a hose engaging member with a frame member of a hose clasp. In said Fig. 21, a frame member 103 of a hose clasp is supported from a foundation garment 104 by an elastic 105. The frame member 103 has a transverse bar 106. A hose engaging member 107 has a hook like portion 108 adapted to cooperate with the transverse bar 106 in clasping a hose, not shown. The hose engaging member 107 is resiliently supported by spring members 109. One end of each spring is fixedly secured to the hose engaging member 107 and the other end thereof is fixedly secured to the lower end portion of the frame member 103. The springs 109 are shaped so that they will yield longitudinally and permit vertical movement of the hose engaging member 107, said springs 109 also yieldingly urge the hose engaging member 107 toward the frame member 103. The hose clasp, shown in Fig. 21, operates in a similar manner to the hose clasp shown in Figs. 18, 19 and 20 to receive and hold a hose.

Figure 22:
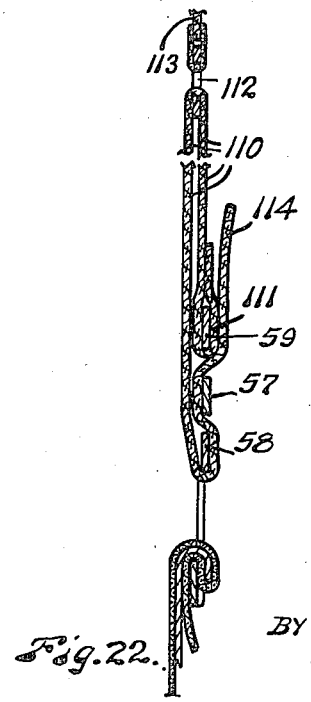
Fig. 22 is a vertical sectional view on an enlarged scale of elastic or strap engaging means, similar to those shown in Figs. 5, 8, 9, 10 and 11, illustrating a modified connection of an elastic therewith with the elastic doubled.

In Fig. 22, I have shown an alternative manner of connecting an elastic or strap member to the adjustable elastic engaging means shown and described in connection with Figs. 8, 9 and 10. In said Fig. 22, an elastic or strap 110 has one end 111 permanently secured to the keeper bar 59. This elastic 110 extends upwardly from the keeper bar 59 through a loop 112 on a foundation garment 113, thence downwardly and under the elastic holding bar 58, thence upwardly between the elastic holding bar 58 and an elastic engaging bar 57, and thence between the elastic engaging bar 57 and the keeper bar 59. This leaves a free end 114 of said elastic readily accessible for purpose of adjustment. In this arrangement, I provide for doubling the elastic or strap 110 and further prevent slippage of the elastic in the elastic holding means.

In Figs. 15 and 16, I have illustrated a modified form of my invention where a hose grip, using the usual button and yoke members, may be employed in such a way that the distance between the elastic supporter and the hose will be reduced to a minimum. As heretofore pointed out, the hose grips of today are characterized by the fact that the elastic supporter between the foundation garment and the hose must be short, as a considerable amount of the space between the hose and the foundation garment is taken up by the hose grip itself. The grips of my invention are characterized by the fact that a minimum space is employed between the hose and the elastic. Such feature of my invention may be obtained and a button type fastener or stud used. Such modification of my invention is illustrated in Figs. 15 and 16. A pliable base member 81 has secured at one end thereof a button type or stud hose engaging element. A hose engaging member 83 is pivotally connected to the other end of the base member 81 and is adapted to turn into and out of engagement with the stud 82. The upper end of the base member 81 may be connected by means of a loop member 84 with an elastic supporter 85.

The operation of the device shown in Figs. 15 and 16 is as follows: The elastic supporter 85 is depending from a foundation garment 86. The lower end of the elastic supporter 85 is connected with a base member 81 by means of a loop member 84. The hose engaging member 83 is positioned under the hose near the top and the free end of the hose extends downwardly on the inside of the member 83 while the remainder of the hose extends downwardly around the member 83. The member 83 having the slot 87 is raised with the hose thereover and the stud 82 is inserted through the slot 87, so that the hose 88 assumes the position shown in the sectional view, Fig. 16. As respects Fig. 16, the leg of the wearer is to the right of the part shown in section.

Referring to the front elevation shown in Fig. 15, it is to be noted that a rounded edge portion 89 is provided, over which the hose is positioned. This provides a relatively broad bearing surface, helps to equalize the strain on the threads of the engaged portion of the hose, and tends to eliminate the runs which generally develop by reason of the use of the button type hose engaging element.

It is to be particularly noted in Fig. 17, which represents a view of my invention in use, that the hose are smooth and free from wrinkles without undue strain on any particular thread. Furthermore, it is to be noted that relatively long elastics are possible because of my invention as compared with the usual hose clasps of today.

Obviously, changes may be made in the forms, dimensions, and arrangement of the parts of my invention, without departing from the principle thereof, the above setting forth only preferred forms of embodiment.

I claim:

1. In a hose supporter, a frame member having a transverse bar; a hose engaging member having an upwardly extending hook like portion receiving a portion of a hose with the hose passing over the outside of the hook like portion and within the hook like portion and over the bar; and means resiliently connecting a lower portion of the frame member with the lower portion of the hose engaging member urging the said members angularly toward each other.

2. In a hose supporter, a frame member having a transverse bar; a hose engaging member having an upwardly extending hook like portion receiving a portion of a hose with the hose passing over the outside of the hook like portion and within the hook like portion and over the bar; hose engaging member supporting means carried by the frame member at a position below said transverse bar; and means resiliently urging the lower portion of the hose engaging member toward said supporting means and urging the frame member and hose engaging member angularly toward each other.

3. In a hose supporter, a frame member having a transverse bar; a hose engaging member having a hook like portion receiving a portion of a hose with the hose passing over the hook like portion and within the hook like portion and over the bar; hose engaging member supporting means carried by the frame member at a position below said transverse bar pivotally receiving the lower portion of said hose engaging member, comprising an outwardly angularly projecting member; and means resiliently urging the lower portion of the hose engaging member toward said supporting means and angularly as respects said frame member.

4. In a hose supporter, a transverse bar; bar supporting means; a releasable hose engaging member having a hook like portion receiving a portion of a hose with the hose passing over the outside of the hook like portion and within the hook like portion and over the bar; and a pliable releasing member for said releasable hose engaging member having one end connected with said hose engaging member and the other end connected with said bar supporting means at a position above the hose.

5. In a hose supporter, a transverse bar; bar supporting means; a relatively long flat releasable hose engaging member having a relatively short hook like portion at one end receiving a portion of a hose with the hose passing over the outside of the hook like portion and within the hook like portion and over the bar; and a pliable releasing member for said releasable hose engaging member having one end connected with said bar supporting means and the other end connected with said relatively long flat releasable hose engaging member at a point removed from said hook like portion and at a position above the hose.

6. In a hose supporter, a frame member, a hose engaging member having hose receiving means and having a relatively broad bearing member over which a hose may be drawn; means on said frame member cooperating with said hose receiving means of said hose engaging member in holding a hose; supporting means connected with said frame member, said supporting means including a transverse strap engaging bar; a loop like member positioned alongside of said supporting means, said loop like member having a strap holding bar positioned below said strap engaging bar and an elastic keeper bar positioned above said strap engaging bar; and a depending pliable strap support extending downwardly past all of said bars and passing around said strap holding bar and thence passing in one direction between said strap holding bar and the bottom of said strap engaging bar and in opposite direction between the top of said strap engaging bar and said strap keeper bar.

7. In a hose supporter, a substantially flat rigid frame member having a transverse bar positioned at a location removed from the lower end of the frame member; a hose engaging member comprising a rigid member with the lower end thereof positionable adjacent the lower end of the frame member and the upper end portion terminating in a hook like member positionable over the transverse bar, whereby the upper portion of a hose may be drawn over the outside of the hook like member, within the hook like member and over the bar; and means resiliently urging the lower ends of the frame member and the hose engaging member angularly toward each other and urging the hose engaging member downwardly as respects the transverse bar of the frame member.

8. In a hose supporter, a substantially flat rigid frame member having a transverse bar positioned at a location removed from the lower end of the frame member; a hose engaging member comprising a rigid member with the lower end thereof positionable adjacent the lower end of the frame member and the upper end portion terminating in a hook like member positionable over the transverse bar, whereby the upper portion of a hose may be drawn over the outside of the hook like member, within the hook like member and over the bar; and means pivotally supporting the lower end of the hose engaging member on the frame member.

CHARLES L. SELLEN.